United States Patent
Eisen (10) Patent No.: US 9,771,172 B2
(45) Date of Patent: Sep. 26, 2017

(54) PRODUCTION METHOD FOR A GLASS CONTAINER

(75) Inventor: Ewald Ludwig Eisen, Graefensteinberg (DE)

(73) Assignee: VitaJuwel GmbH, Scheidegg (DE)

( * ) Notice: Subject to any disclaimer, the term of this patent is extended or adjusted under 35 U.S.C. 154(b) by 862 days.

(21) Appl. No.: 14/126,657

(22) PCT Filed: Jun. 14, 2012

(86) PCT No.: PCT/EP2012/061367
§ 371 (c)(1),
(2), (4) Date: Jan. 13, 2014

(87) PCT Pub. No.: WO2012/172023
PCT Pub. Date: Dec. 20, 2012

(65) Prior Publication Data
US 2014/0116011 A1    May 1, 2014

(30) Foreign Application Priority Data
Jun. 17, 2011   (DE) .................. 10 2011 051 143

(51) Int. Cl.
C03B 23/207   (2006.01)
C03B 23/213   (2006.01)
B65B 1/02   (2006.01)
C03B 23/13   (2006.01)
B65B 7/16   (2006.01)

(52) U.S. Cl.
CPC ............... B65B 1/02 (2013.01); C03B 23/13 (2013.01); C03B 23/207 (2013.01); *B65B 7/161* (2013.01)

(58) Field of Classification Search
CPC .......................... C03B 23/207; C03B 23/213
See application file for complete search history.

(56) References Cited

U.S. PATENT DOCUMENTS

| | | | | |
|---|---|---|---|---|
| 1,850,190 A | * | 3/1932 | Welch | A44C 17/007 63/31 |
| 3,594,255 A | * | 7/1971 | Budinger | B41N 7/04 101/148 |
| 4,142,383 A | * | 3/1979 | Eberhart | A44C 15/00 156/145 |
| 6,568,218 B1 | | 5/2003 | Mueller et al. | |

(Continued)

FOREIGN PATENT DOCUMENTS

| | | |
|---|---|---|
| DE | 10 2008 010 015 | 6/2009 |
| EP | 0461699 | 12/1991 |

(Continued)

OTHER PUBLICATIONS

"Inspiration", Morovan, Das Kundemagazin, Ausgabe 12, Dec. 2007.
VitaJuwel, "Water in its Noblest Form", Golden Spa Resports by VIP International, 2011.

*Primary Examiner* — Cynthia Szewczyk
(74) *Attorney, Agent, or Firm* — Dicke, Billig & Czaja, PLLC (57) ABSTRACT

A production method for a closed glass container containing at least one solid body is disclosed. The method includes providing a tube tapering toward one end, the inner diameter of which is smaller at a tapered end than an inner diameter at an opposite first end. The tube is connected at the tapered end to a first end of a straight bar tube. The tapered tube is charged with at least one solid body.

9 Claims, 9 Drawing Sheets

(56) References Cited

U.S. PATENT DOCUMENTS

| | | |
|---|---|---|
| 7,820,256 B2 | 10/2010 | Eisen |
| 2004/0007280 A1 | 1/2004 | Rausch et al. |
| 2009/0155503 A1* | 6/2009 | Eisen .................... A47G 21/00 428/34.1 |

FOREIGN PATENT DOCUMENTS

| | | |
|---|---|---|
| FR | 709.988 | 1/1931 |
| JP | 59128224 | 7/1984 |
| JP | 2003034542 | 2/2003 |

\* cited by examiner

PRODUCTION METHOD FOR A GLASS CONTAINER

CROSS REFERENCE TO RELATED APPLICATION

This Utility Patent Application claims priority under 35 U.S.C. §371 to International Application Serial No. PCT/EP2012/061367, filed Jun. 14, 2012, which claims the benefit of German Patent Application No. DE 10 2011 051 143.1, filed Jun. 17, 2011; which are both incorporated herein by reference.

BACKGROUND

The present invention relates to a method for the production of a closed glass container filled with a fluid, said glass container being in the form of a stirring rod which contains at least one solid body.

The glass container comprises a voluminous basal part and a tubular segment of smaller diameter fitted thereon. The basal part and the tubular segment are in fluid communication with one another. The use of the glass container as a stirring rod provides for the arrangement of the at least one solid body and a substantial part of the fluid present overall in the glass container in said widened end of the glass vessel, i.e. in its voluminous basal part.

Problems with the stability of the connection between the voluminous basal part and the tubular segment of smaller diameter fitted thereon can result from the solid body disposed freely mobile in the basal part and the desired almost complete filling of the glass container with a fluid, said problems requiring a special design solution. On the other hand, there are production-related problems.

The problem underlying the invention is to provide a production method for a glass container in the form of a stirring rod.

A production method is described according to claim 1, which solve the aforementioned problems.

BRIEF DESCRIPTION OF THE DRAWINGS

The present invention is explained below by way of example with the aid of figures. In the figures.

DETAILED DESCRIPTION

Figure 1:
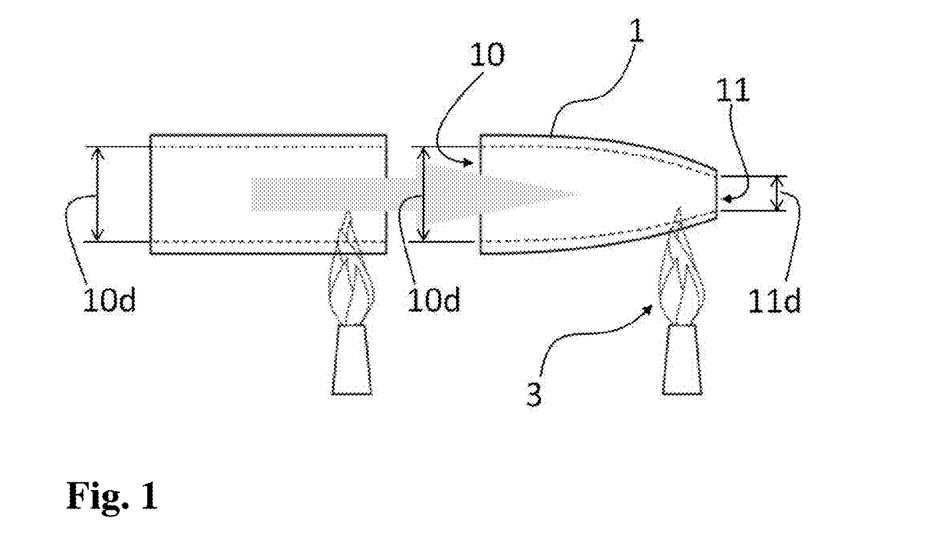
FIG. 1 shows work steps for the production of a tube tapered towards one end for the assembly of a glass container.

FIG. 1 shows diagrammatically how a tube 1 tapered on one side for the assembly of a glass container can be produced from a rod tube having internal diameter $10d$. Tapered tube 1 has two openings of differing inside width or differing internal diameter d. It is produced from a tube in a manner commonly known to the person skilled in the art. Tube 1 tapered on one side at a first end 11 comprises an opening 10 at its base, i.e. at its second end, and has a second inside width $10d$ at this base which is larger than inside width $11d$ at first end 11 of tapered tube 1.

A tube 1 thus tapered on one side can be produced from glass or transparent plastic material. It is produced in a manner known to the person skilled in the art. For example, a glass tube is uniformly fused over flame 3 of a suitable burner, drawn out, cooled, scored and the tapered end snapped off. In a subsequent work step, the region of the one-sided tapered portion thus obtained is severed from the remaining, non-tapered glass tube (see grey arrow in FIG. 1).

Figure 2:
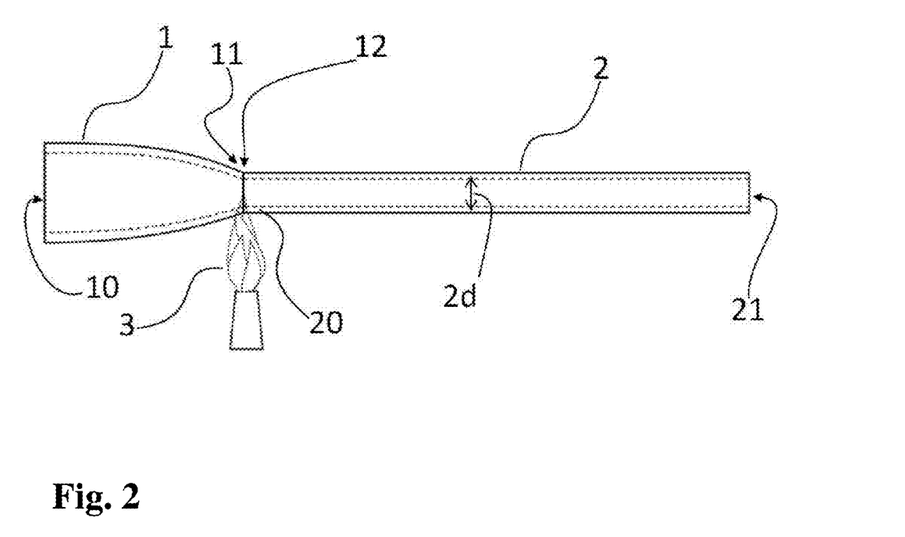
FIG. 2 shows the connection of the tapered tube to a rod tube.

In a subsequent process step, obtained tube 1 essentially having the external shape of a paraboloid is connected on one side at its first end 11 over flame 3 of a suitable burner to a first end of a rod tube 2 (see FIG. 2). Internal diameter $2d$ of rod tube 2 is equal to or similar to internal diameter $11d$ of tapered tube 1. A glass tube which more or less has the typical shape of a funnel thus arises. The open end of tapered tube 1 corresponding to the upper wide part of a funnel and the narrow part of tube rod 2 corresponding to a spout of a funnel are thus formed.

Both can be transparent and made of the same or similar materials. Both can also be made of completely different materials. For example, the materials can have a different surface structure, a different degree of transparency and a different colouring.

Mineral glasses are typically used to produce described glass container 125. It is a particular advantage of the use of mineral glasses such as quartz glass or borosilicate glass that both the inner and the outer surface of obtained glass vessel 125 is smooth and pore-free and can be selected such that the liquid coming into contact with it runs away free from cords.

The exemplary use of borosilicate glass or quartz glass for glass container 125 described here is based on the chemical and thermal properties of borosilicate glass and quartz glass as well as a plurality of other advantages which distinguish borosilicate glass and quartz glass from other glasses. These include, in particular, properties such as a smooth, pore-free surface; catalytic indifference; physiologically safe; odour and taste neutrality; non-combustibility; transparency.

Figure 3:
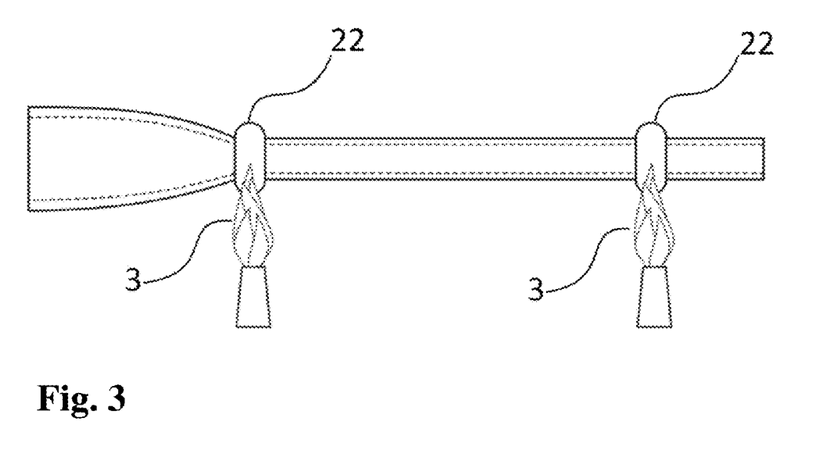
FIG. 3 shows the formation of toroidal rings on the rod tube.

According to one or more embodiments, a peripheral tubular widened portion 22 is formed on glass tube 2 itself, at least at the point of its connection 12 with tapered tube 1. Toroidal ring 22 thus formed confers greater strength and stability on connection 12 between smaller first opening 11 of tapered tube 1 with the first end of rod tube 2. A second annular widened portion of equal size and shape or similar size and shape can be formed in the vicinity of second end 21 of rod tube 2.

The formation of toroidal rings 22 takes place for example by uniform fusion of the corresponding tube sections, compression and application of internal pressure, such as is known for example from glass blowing (see FIG. 3). A glass tube thus arises, which more or less has the typical shape of a funnel and whose spout formed by rod tube 2 at its lower end has been compressed thereby forming a peripheral toroidal ring 22.

In a next step, tapered tube 1 fitted with its smaller first opening 11 flush on glass tube 2 with toroidal ring 22 is provided with at least one solid body 50. For this purpose, the given solid body 50 is introduced from second opening 10 of glass tube 1. According to an exemplary embodiment, tapered tube 1 is filled roughly up to a third with a plurality of solid bodies 50. For this purpose, the approximately funnel-shaped tube is held upright or at least inclined and solid body 50 is placed into its upper part, i.e. into the tapered tube. The average diameter of solid bodies 50 typically used lies above the size of inner diameter 11d of the first opening of the tapered tube, i.e. above internal diameter 2d of rod tube 2. This thus ensures that the beaker formed by tapered tube 1 can readily be filled up to the desired level with introduced solid bodies 50 (see FIG. 4).

Figure 4:
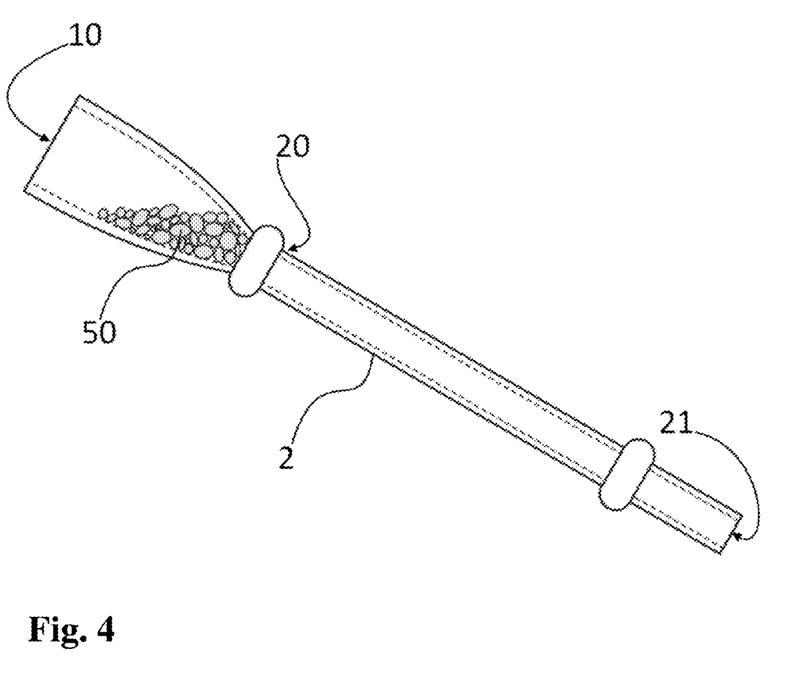
FIG. 4 shows the filling of a tapered tube with solid bodies.

Optionally, it is also possible for just a single solid body 50, for example a crystal, a piece of mineral or a chip of mineral or a precious stone or a semiprecious stone to be introduced into tapering tube 1.

According to one or more embodiments, the at least one solid body 50 that is introduced into the glass container can be selected from: agate, amazonite, aquamarine, aventurine, rock crystal, calcite, chalcedony, diamond, garnet, halite salt, jasper, lapis lazuli, magnesite, white opal, mossy agate, opal, orange calcite, ocean jasper, pistachio opal, quartz, rough diamond, rose quartz, red jasper, rutile quartz, emerald, sodalite and petrified wood.

According to further exemplary embodiments, a plurality of solid bodies 50 such as a mineral, such as pieces or chips of mineral and/or precious stones or pieces or chips of precious stones in rough and/or partially and/or completely ground and/or partially and/or completely polished form can be introduced together into a glass container.

Typical combinations relate to combinations of the following materials: pistachio opal, rock crystal; or amethyst, chalcedony, ocean jasper, petrified wood, rose quartz; or rough diamond, rock crystal; or garnet, rock crystal; or red jasper, magnesite, rock crystal; or rose quartz, amethyst, avenurine; or white opal, chalcedony, mossy agate; or aquamarine, rock crystal; or lapis lazuli, rutile quartz; or red jasper, sodalite, orange calcite, brown agate, aventurine; or rock crystal, garnet, amethyst; or emerald, rock crystal; or orange calcite, rock crystal; or amethyst, rock crystal; or sodalite, rock crystal; or rose quartz, amethyst, rock crystal.

Figure 5:
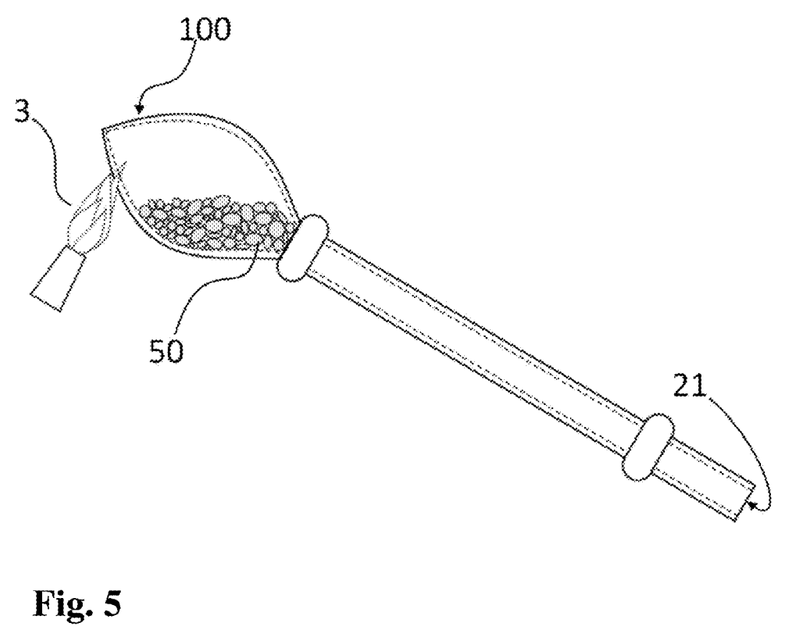
FIG. 5 shows the closing of a tapered portion filled with solid bodies.

The upper edge of tapered tube 1 can be narrowed by careful fusion and wide opening 10 of tube 1 can thus be gradually closed. For this purpose, the upper part of tapered tube 1 is fused uniformly at and beneath its second opening 10, pressed inwards and closed while being constantly rotated over flame 3 of a suitably adjusted burner (see FIG. 5) and thereby smoothed. A detailed description of the details known to the person skilled in the art will not be given here.

Figure 6:
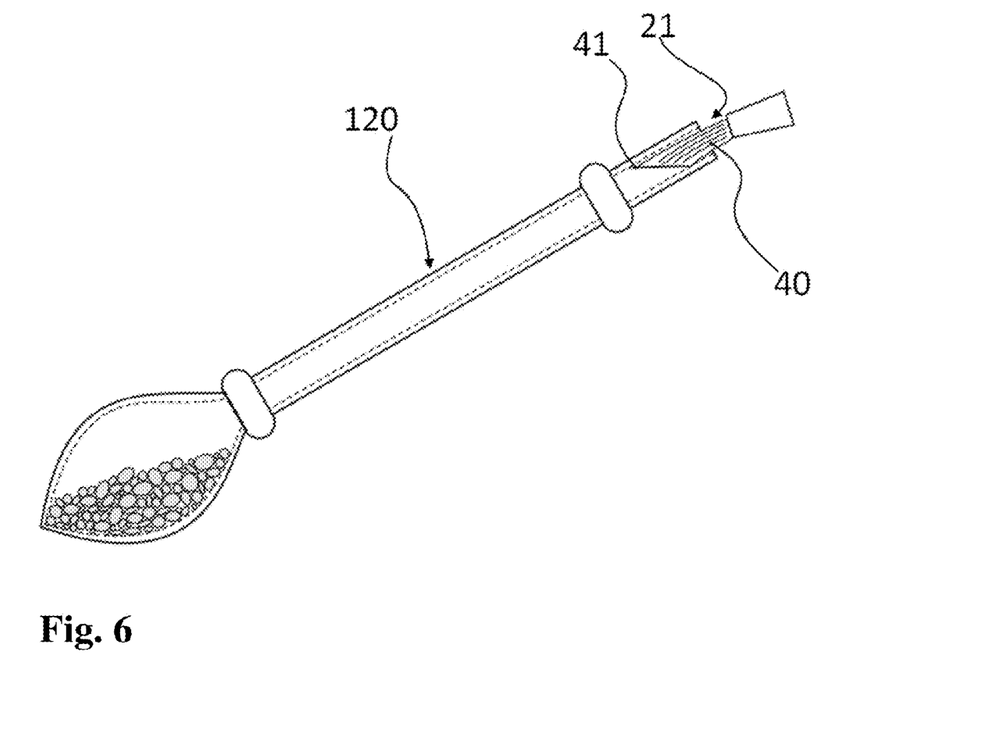
FIG. 6 shows the filling of the obtained vial with a liquid through the opening of the vial (rod tube)

After the cooling, vial 120 thus obtained from the tapered tube and the rod tube is filled with a fluid 40 (see FIG. 6). As fluid 40 introduced in the glass container, use may be made of any essentially transparent fluid that does not react chemically with the at least one solid body. Exemplary fluids 40 are either pure liquids or solvents such as for example water, aqueous solutions, in particular saturated salt solutions and/or colloidal solutions, sols or gels, ionic liquids, salt liquid at room temperature and/or molten salt. Further exemplary fluids can be selected from: organic liquids, in particular alcohols, polyols, silicones, silicone oils as well as any liquid polymers or polymer solutions, mineral oils and/or gases and their mixtures.

Fluid 40 is advantageously selected such that no chemical reaction takes place between introduced solid bodies 50 with one another or with the fluid or any substances that may be additionally dissolved therein. An advantage of this selection consists in the fact that the fluid introduced in the glass container remains transparent and does not become discoloured even with lengthy exposure to light. Furthermore, fine structures, for example ground surfaces or polished faces or facets, formed on solid body 50 are not changed by the selection of fluid 40 taking place as described.

A toroidal ring 22 in abutting region 12 between openings 11 and 20 corresponding to one another advantageously confers greater stability on the connection between tapered tube 1 and rod tube 2 than would be able to be obtained without this toroidal ring 22. Finished glass container 125 has on one side, at its—when in use—lower bulbous end, a much greater mass than at its—when in use—upper rod-shaped end. The formation of rod-shaped tube 2 at the transition between rod-shaped tube 2 and the bulbous end formed from tapered tube 1 proved to be stabilising and prevents breakage of the joint connection in abutting region 12 and in its vicinity when glass container 125 is being used in the intended manner.

Figure 7:
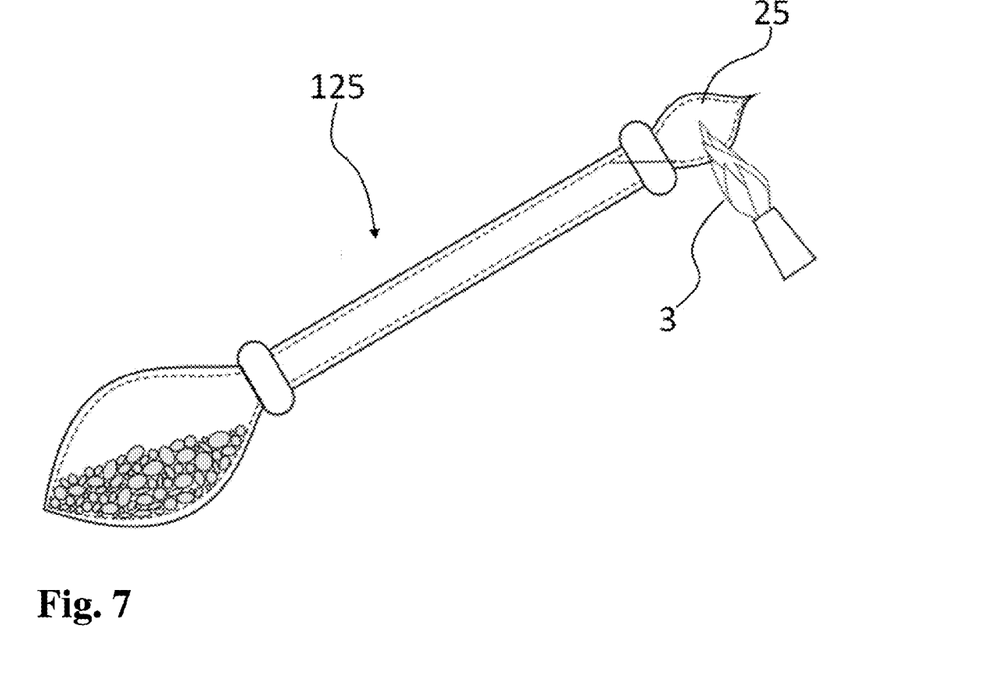
FIG. 7 shows the closing of a flared formation at the opening of the vial.

In a next step, the initially still straight second end 21 of rod tube 2 is widened above a second toroidal ring 22 before remaining open end 21 of vial 120. When use is made of glass, for example, the again executed gradual tapering of widened portion 25 over a flame 3 of a suitably adjusted burner 3 can be used to close vial 120 with a spherical or drop-shaped closure 25 (see FIG. 7).

Figure 8:
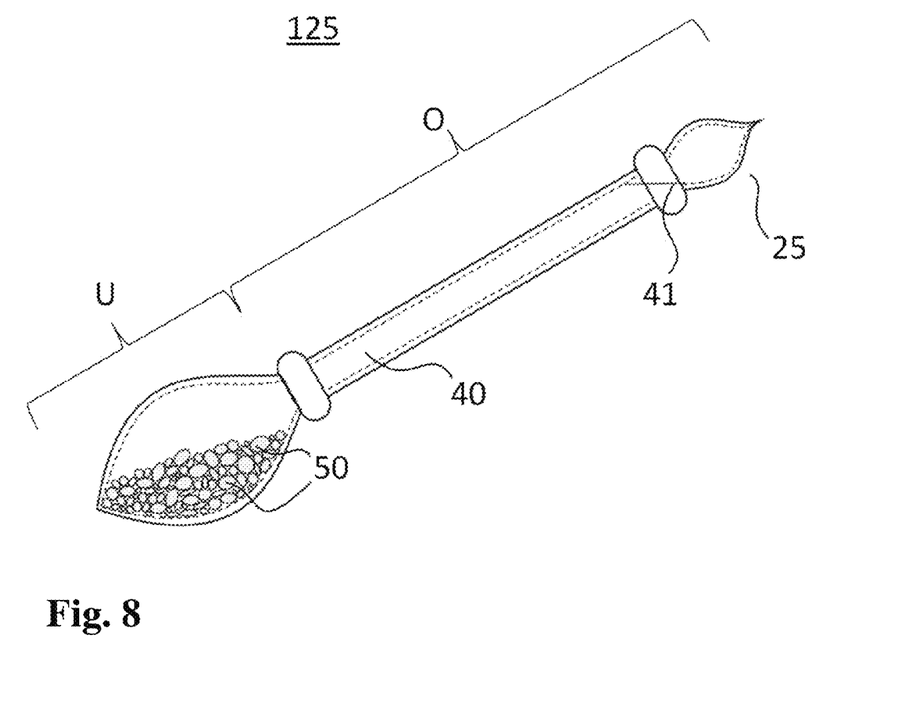
FIG. 8 shows the view of a glass container after completion.

FIG. 8 shows a glass container 125 with an essentially elongated shape, which is obtained in the manner described above and is closed in a fluidically sealed manner. Glass container 125 comprises a curved lower container part U with at least one solid body 50 and a straight upper part O provided with a smaller thickened portion 25 and is filled almost completely with a liquid 40.

The position of meniscus 41 of fluid 40 used to fill the glass container typically lies in the region of upper part O of glass container 125 when glass container 125 is essentially in an upright position. An essentially upright position is understood to mean the spatial orientation of the glass container in which lower part U is located beneath an imaginary horizontal plane and upper part O is located above this imaginary horizontal plane. Such an essentially upright position arises under terrestrial conditions when, for example, upper part O of glass container 125 is fixed or held rotatably at its upper end O.

Figure 9:
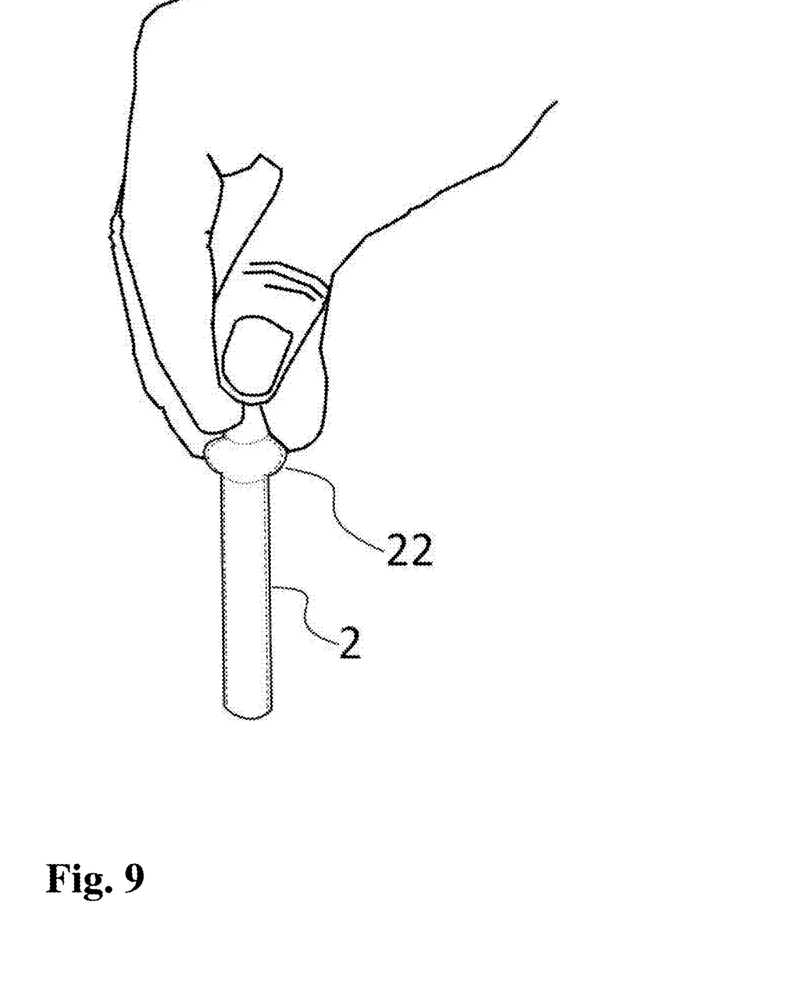
FIG. 9 shows the holding of a stirring rod with the right hand when the rod is picked up.

The toroidal ring in upper part O of glass container 125 offers the advantage, when glass container 125 is being gripped and held with the hand, of ensuring a good grip in the interaction of the fingers of the gripping and holding hand with closure 25 and ring 22 adjacent thereto (see FIG. 9).

Advantages of the combinations of individual process steps described above consist in the provision of a glass container 125 which on the one hand can easily be fixed and/or can easily be held in a suitable holding fixture and which is therefore well suited for use as a stirring rod when used in the intended manner. On the other hand, the stirring rod produced in the manner described withstands the shear loads arising during use in the intended manner, in particular at the connection of basal part U of glass vessel 125 with tubular rod-shaped upper segment O fitted thereto. Glass vessel 125 is stable especially at and in the vicinity of toroidal annular widened portions 22 of rod tube 2 and exhibits a reduced tendency towards breakage compared with the conventional direct connection of a rod tube without toroidal ring 22.

A particular advantage of the arrangement of a toroidal ring 22 directly before caudal widened portion 25 of upper part O of glass vessel 125 consists in the formation of an engagement. This engagement offers a secure hold or permits reliable fixing of the glass vessel in a suitable holding fixture. Furthermore, further elements can be reliably attached in a movable manner as a result of the constricted region formed between toroidal ring 22 and caudal widened portion 25 of rod tube 2 in upper part O of vessel 125. Examples of this are the permanent, but axially mobile fixing of an eyelet, a ring or a loop or a sling. This permits such glass vessels to be provided, for example, with individual markings.

The present invention has been explained with the aid of examples of embodiment. These examples of embodiment are on no account to be understood as limiting for the present invention. The following claims represent a first, non-binding attempt at defining the invention in general.

What is claimed is:

1. A method for producing a closed glass container containing at least one solid body and a fluid, comprising:
   providing of a glass tube tapered towards a first end, where an inside width at the tapered first end is smaller than an inside width at an opposite-lying second end;
   connecting of the glass tube at the tapered first end with a first end of a straight rod glass tube;
   introducing at least one solid body into the tapered glass tube from the second end of the tapered glass tube;
   closing of the tapered glass tube at the second end having the larger inside width to form a glass vial;
   filling the glass vial thus obtained with a fluid; and
   closing the glass vial at the second end of the rod glass tube.

2. The method according to claim 1, further comprising;
   forming at least one toroidal glass ring on the rod glass tube; wherein the at least one toroidal glass ring is convex.

3. The method according to any one of claim 1, further comprising:
   disposing a toroidal glass ring at the connection point of the rod glass tube with the tapered first end of the tapered glass tube.

4. The method according to claim 1, further comprising:
   forming of a widened portion at the second end of the rod glass tube; and
   closing the glass vial in a fluidically sealed manner by closing the widened portion.

5. The method according to any one of claim 1, further comprising:
   selecting of an average diameter of the at least one solid body, such that the diameter lies above the internal diameter of the rod glass tube and the at least one solid body, in the multiplicity of its possible spatial orientations, cannot pass through the rod glass tube.

6. The method according to claim 1, further comprising:
   selecting the at least one solid body from a group consisting of agate, amazonite, aquamarine, aventurine, rock crystal, calcite, chalcedony, diamond, garnet, halite salt, jasper, lapis lazuli, magnesite, white opal, mossy agate, opal, orange calcite, ocean jasper, pistachio opal, quartz, rough diamond, rose quartz, red jasper, rutile quartz, emerald, sodalite and petrified wood.

7. The method according to claim 1, wherein the solid body used for the introduction comprises combinations of different solid bodies, selected from a group consisting of: pistachio opal, rock crystal; or amethyst, chalcedony, ocean jasper, petrified wood, rose quartz; or rough diamond, rock crystal; or garnet, rock crystal; or red jasper, magnesite, rock crystal; or rose quartz, amethyst, avenurine; or white opal, chalcedony, mossy agate; or aquamarine, rock crystal; or lapis lazuli, rutile quartz; or red jasper, sodalite, orange calcite, brown agate, aventurine; or rock crystal, garnet, amethyst; or emerald, rock crystal; or orange calcite, rock crystal; or amethyst, rock crystal; or sodalite, rock crystal; or rose quartz, amethyst, rock crystal.

8. The method according to claim 1, wherein the fluid is selected from a group consisting of: water, ionic liquids, saturated salt solutions, mineral oils, silicones, silicone oils, alcohols, polymers, ketones, gases and/or their mixtures.

9. The method according to claim 1, wherein the filling takes place with a fluid which is physiologically isotonic.

* * * * *